US010730446B2

(12) United States Patent
Wilson

(10) Patent No.: US 10,730,446 B2
(45) Date of Patent: Aug. 4, 2020

(54) TRUCK BED ON-BOARD STORAGE SYSTEM

(71) Applicant: Jeff A. Wilson, Lakewood, CO (US)

(72) Inventor: Jeff A. Wilson, Lakewood, CO (US)

(*) Notice: Subject to any disclaimer, the term of this patent is extended or adjusted under 35 U.S.C. 154(b) by 0 days.

(21) Appl. No.: 16/531,750

(22) Filed: Aug. 5, 2019

(65) Prior Publication Data

US 2019/0351835 A1 Nov. 21, 2019

Related U.S. Application Data

(63) Continuation-in-part of application No. 15/794,370, filed on Oct. 26, 2017, now Pat. No. 10,513,229, which is a continuation-in-part of application No. 15/281,928, filed on Sep. 30, 2016, now Pat. No. 9,802,548, which is a continuation-in-part of application No. 15/009,686, filed on Jan. 28, 2016, now Pat. No. 9,650,085, which is a continuation-in-part of application No. 14/340,220, filed on Jul. 24, 2014, now abandoned.

(60) Provisional application No. 61/865,742, filed on Aug. 14, 2013.

(51) Int. Cl.
*B60R 9/06* (2006.01)
(52) U.S. Cl.
CPC ..................................... *B60R 9/06* (2013.01)
(58) Field of Classification Search
CPC .. B60R 13/01; B60R 9/00; B60R 9/06; B60R 7/02
See application file for complete search history.

(56) References Cited

U.S. PATENT DOCUMENTS

| | | | |
|---|---|---|---|
| 2,897,781 A | 8/1959 | Olson | |
| 3,353,704 A | 11/1967 | Belcher | |
| 4,091,950 A | 5/1978 | Craven | |
| 4,162,098 A * | 7/1979 | Richardson, III | ...... B60R 13/01 220/23.9 |
| 4,635,992 A | 1/1987 | Hamilton | |
| 4,850,519 A | 7/1989 | Farmer, Jr. | |
| 4,875,730 A * | 10/1989 | Justice | ...... B60P 7/14 296/37.5 |
| 5,065,699 A | 11/1991 | Marshall | |
| 5,147,103 A | 9/1992 | Ducote | |

(Continued)

FOREIGN PATENT DOCUMENTS

WO    1989/012564 A1    12/1989

OTHER PUBLICATIONS

"Goose Gear Taco Base Plate—ExplorationOutfitters.com", 10 pages, availableon the Internet at www.explorationoutfitters.com at least as early as Jul. 30, 2019.

*Primary Examiner* — Corey N Skurdal
(74) *Attorney, Agent, or Firm* — Trenner Law Firm, LLC; Mark D. Trenner

(57) ABSTRACT

An example truck bed on-board storage system includes a bed panel configured to fit into a floor of a truck bed of a truck between the wheel wells of the truck bed. Front wings are hinged to the front sides of the bed panel, the front wings pivoting on the hinge to lay flat in the truck bed in front of the wheel wells. Rear wings are hinged to the rear side of the bed panel, the rear wings pivoting on the hinge to lay flat in the truck bed behind the wheel wells. A plurality of braces apply pressure between the bed rail of the truck bed and the bed panel to secure the bed panel against the floor of the truck bed.

20 Claims, 11 Drawing Sheets

(56) References Cited

U.S. PATENT DOCUMENTS

| | | | |
|---|---|---|---|
| 5,169,200 A | 12/1992 | Pugh | |
| 5,186,510 A | 2/1993 | Stapp | |
| 5,201,561 A | 4/1993 | Brown | |
| 5,398,868 A | 3/1995 | Densen | |
| 5,464,264 A | 11/1995 | Wilson | |
| 5,501,500 A | 3/1996 | Cannon | |
| 5,598,961 A | 2/1997 | Sills | |
| 5,599,055 A * | 2/1997 | Brown | B60P 7/14 296/37.6 |
| 6,135,527 A | 10/2000 | Bily | |
| 6,257,640 B1 | 7/2001 | Leitner | |
| 6,267,427 B1 * | 7/2001 | Ziehl | B60P 7/0892 224/403 |
| 6,491,331 B1 * | 12/2002 | Fox | B60P 3/40 224/403 |
| 6,499,434 B1 | 12/2002 | Tyler | |
| 6,536,826 B1 | 3/2003 | Reed | |
| 6,641,013 B2 | 11/2003 | Dise | |
| 7,028,859 B2 | 4/2006 | Moon et al. | |
| D520,190 S | 5/2006 | Joyner | |
| 7,290,820 B1 * | 11/2007 | Smith | B60R 11/00 296/37.6 |
| 8,070,210 B2 | 12/2011 | Lotz | |
| 8,317,442 B2 | 11/2012 | Daikuzono | |
| 9,247,711 B2 | 2/2016 | Reginhard | |
| 9,650,085 B2 | 5/2017 | Wilson | |
| 2004/0084491 A1 * | 5/2004 | Gibson | B60P 3/07 224/403 |
| 2005/0229866 A1 | 10/2005 | Simpson et al. | |
| 2006/0266778 A1 | 11/2006 | Allotey | |
| 2012/0085800 A1 | 4/2012 | Maimin | |
| 2015/0048129 A1 | 2/2015 | Wilson | |
| 2016/0167718 A1 | 6/2016 | Wilson | |
| 2017/0015254 A1 | 1/2017 | Wilson | |
| 2018/0086277 A1 | 3/2018 | Wilson | |

* cited by examiner

TRUCK BED ON-BOARD STORAGE SYSTEM

PRIORITY CLAIM

This application is a continuation-in-part (CIP) application of U.S. patent application Ser. No. 15/794,370 filed Oct. 26, 2017 for "Truck Bed On-Board Storage System" of Jeff A. Wilson, which is a continuation-in-part (CIP) application of U.S. patent application Ser. No. 15/281,928 filed Sep. 30, 2016 for "Truck Bed Storage System" of Jeff A. Wilson, which is a continuation-in-part (CIP) application of U.S. patent application Ser. No. 15/009,686 filed Jan. 28, 2016 for "Modular Truck Bed Storage System" of Jeff A. Wilson, which is a continuation-in-part (CIP) application of U.S. patent application Ser. No. 14/340,220 filed Jul. 24, 2014 for "Modular Truck Bed Storage System" of Jeff A. Wilson and claims the priority benefit of U.S. Provisional Patent Application No. 61/865,742 filed Aug. 14, 2013 for "Truck Storage" of Jeff A. Wilson, each hereby incorporated by reference in its entirety as though fully set forth herein.

BACKGROUND

Pickup trucks continue to be a popular choice of consumers for a variety of uses (e.g., personal/recreational and commercial transportation). One reason for their popularity is the truck bed which enables transport of cargo and other articles outside of the passenger cabin. Unfortunately, anything stowed in the truck bed generally remains visible and is susceptible to weather and theft.

DETAILED DESCRIPTION

A truck bed storage system is disclosed which may be readily assembled and unassembled in a bed of a truck or "truck bed." An example truck bed on-board storage system includes a bed panel configured to fit into a floor of a truck bed of a truck between the wheel wells of the truck bed. Front wings are hinged to the front sides of the bed panel, the front wings pivoting on the hinge to lay flat in the truck bed in front of the wheel wells. Rear wings are hinged to the rear side of the bed panel, the rear wings pivoting on the hinge to lay flat in the truck bed behind the wheel wells. A plurality of braces or arms apply pressure between the bed rail of the truck bed and the bed panel to secure the bed panel against the floor of the truck bed. The truck bed storage system can be readily uninstalled from the truck bed, and easily stored. The truck bed storage system disclosed herein is simple and quick to install without needing tools.

In an example, the truck bed on-board storage system includes any number of enclosures. Example enclosures include but are not limited to, a tool box, a pet enclosure, and any of a variety of racks (e.g., bicycle rack, ski rack, etc.). It is noted that any number of enclosures may be installed in the truck bed (e.g., below the truck bed rail), adjacent other enclosures, and even on top of other enclosures such that some or all of an enclosure is mounted platform above the truck bed rail.

Before continuing, it is noted that as used herein, the terms "includes" and "including" mean, but is not limited to, "includes" or "including" and "includes at least" or "including at least." The term "based on" means "based on" and "based at least in part on."

It should be further noted that the truck bed storage system should not be limited to dimensions which may be represented in the figures. Various sizes and dimensions may be used to accommodate a variety of vehicles (e.g., large and smaller truck beds) and/or various configurations of the truck bed storage system itself. Nor should the truck bed storage system be limited to any particular material of manufacture. In addition, components shown and described in the example(s) may be interchanged and/or added to and/or removed from components of another of the example(s).

Figure 1A:
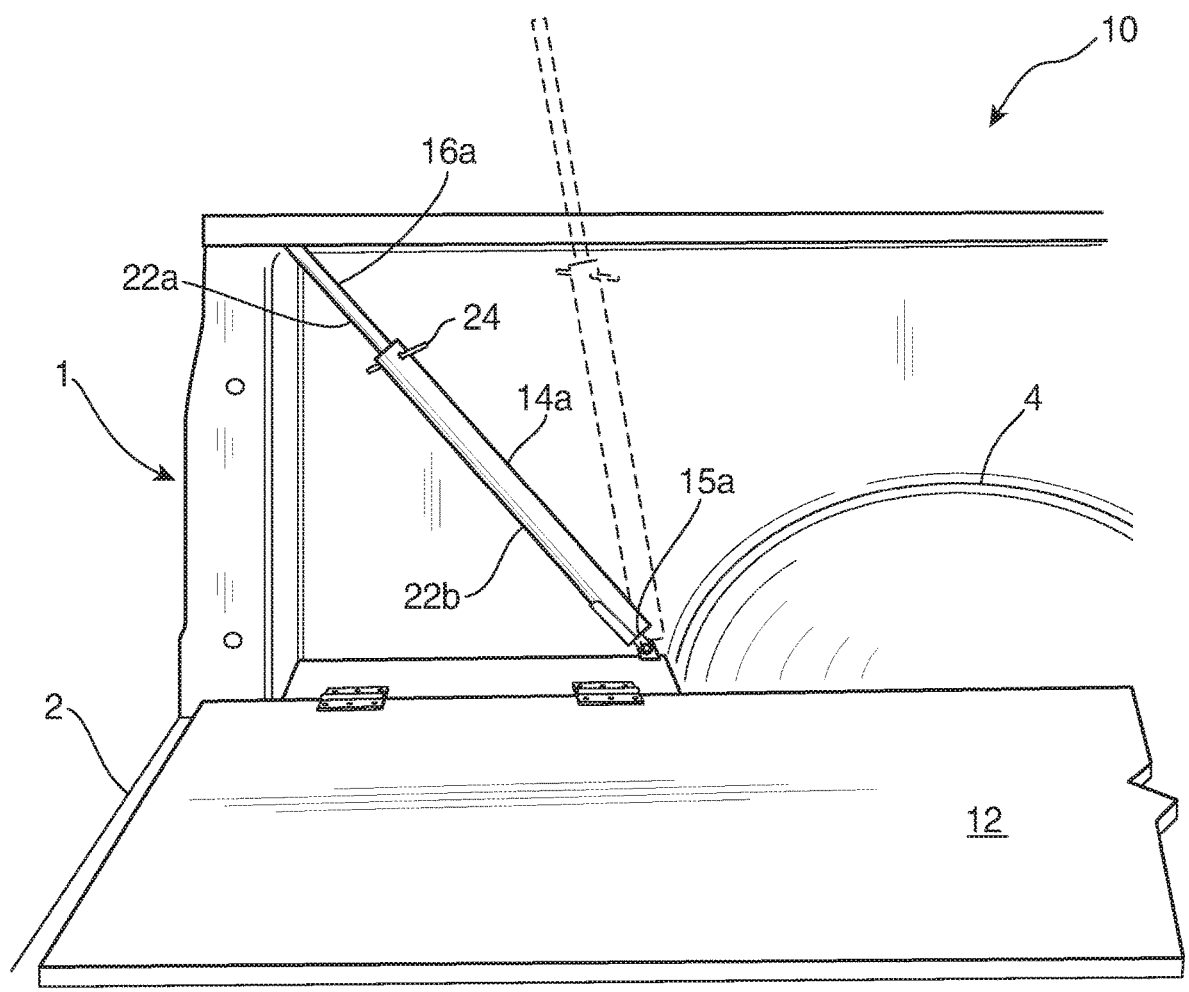
FIGS. 1A and 1B show an example bed panel of a truck bed storage system as it may be installed in a truck bed.
Figure 1B:
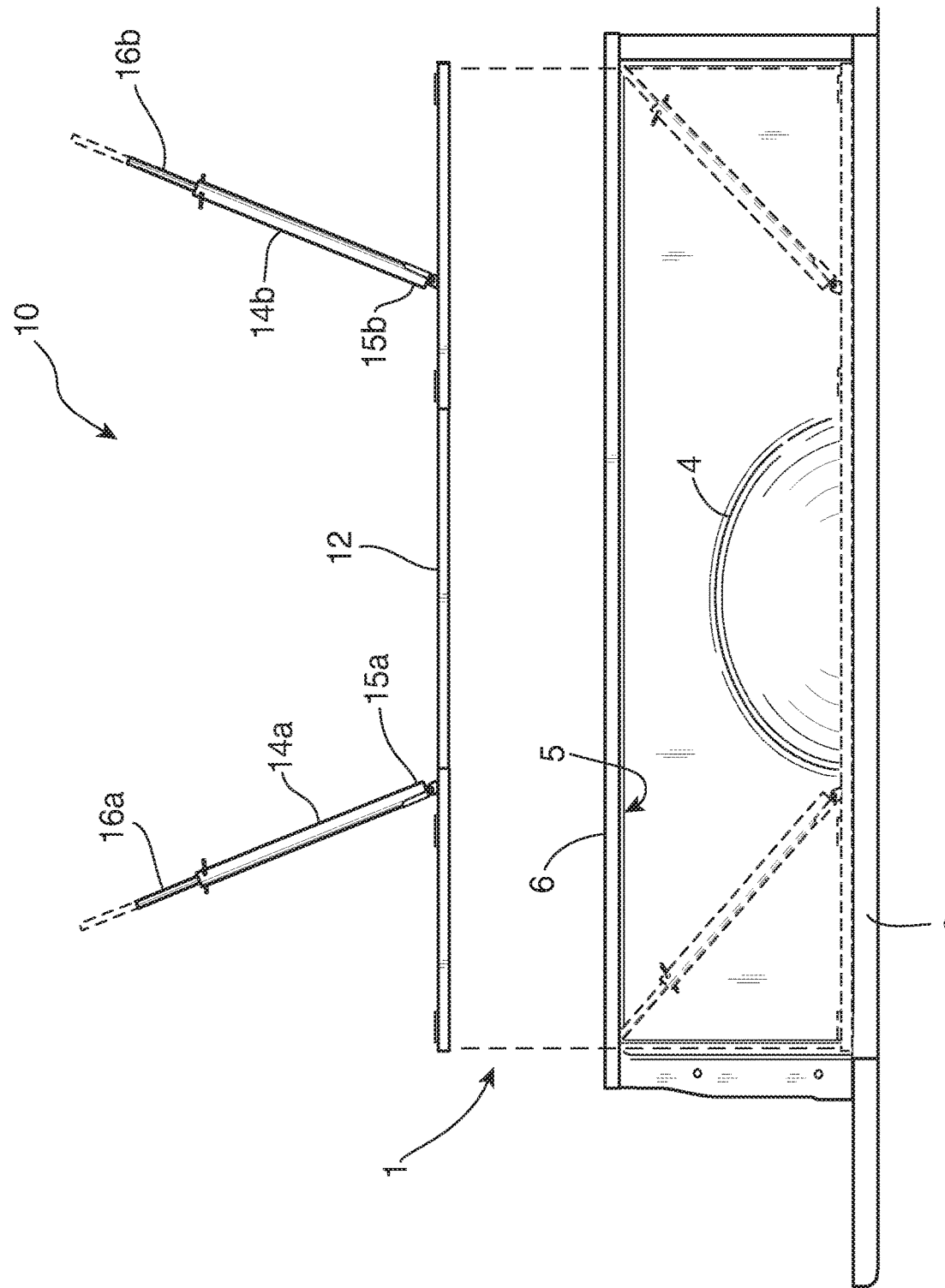
Figure 2:
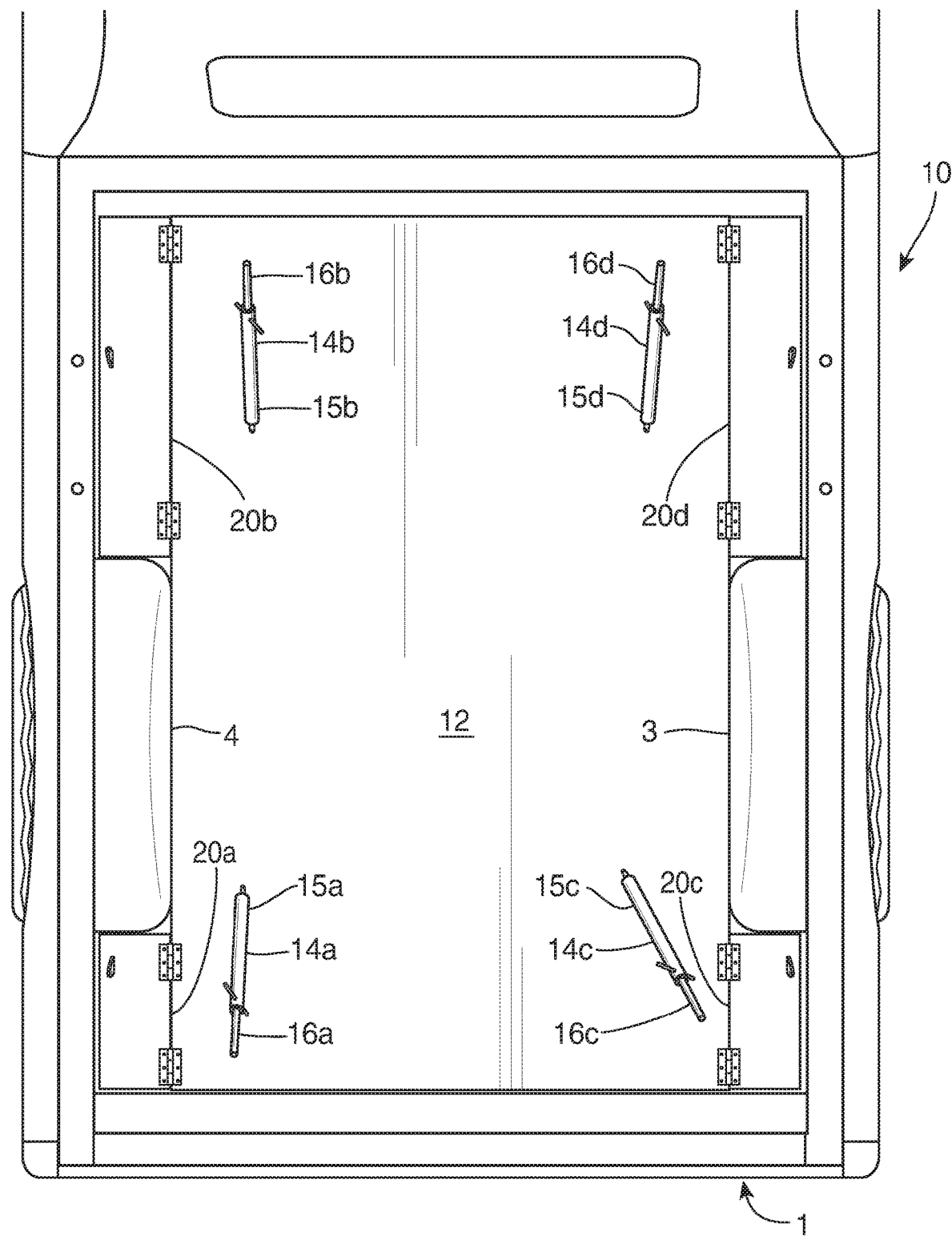
FIG. 2 is a top view of the example bed panel of the truck bed storage system illustrating installation in a truck bed.
Figure 3:
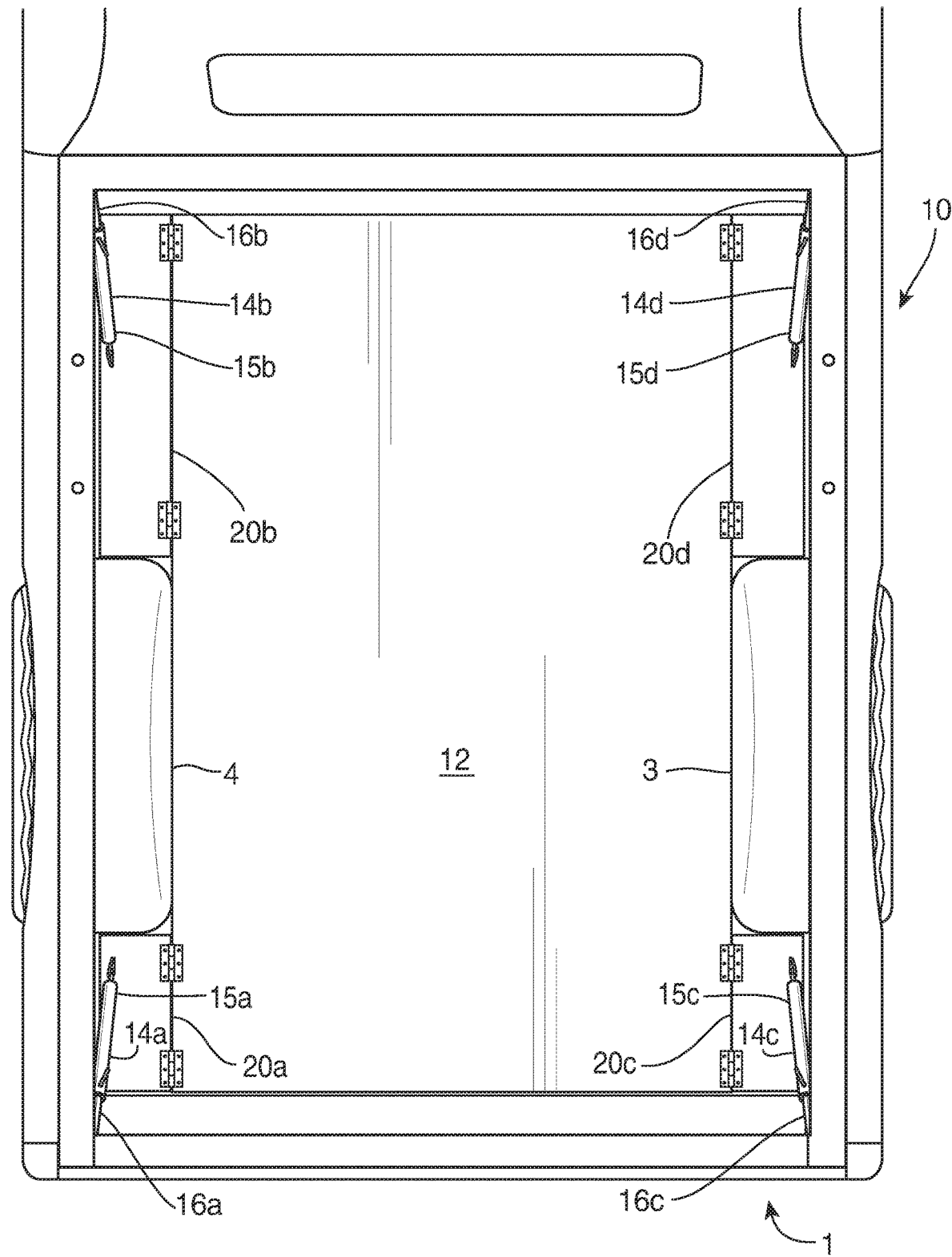
FIG. 3 is a top view of FIG. 2 illustrating the example bed panel of the truck bed storage system installed in the truck bed.

FIGS. 1A and 1B show an example truck bed storage system 10 as it may be installed in a truck bed 1. FIG. 2 is a top view of the example truck bed storage system 10 illustrating installation in the truck bed 1. FIG. 3 is a top view of FIG. 2 illustrating the example truck bed storage system 10 installed in the truck bed 1.

The storage system 10 may be provided in any of a variety of sizes according to the size of the storage space desired and the size of the pick-up truck bed 1 into which the system will be assembled. Any of a variety of articles may be held within an assembled truck-bed storage system 10, for example, a toolbox for tools, and other enclosures for recreational equipment.

An example truck bed on-board storage system 10 includes a bed panel 12 configured to fit (e.g., slide) into a floor 2 of a truck bed 1 of a truck between a right wheel well 3 and a left wheel well 4 of the truck bed 1. The example truck bed on-board storage system 10 also includes a plurality of braces or arms 14a-d. In an example, the braces 14a-d are compression braces. The term "compression" when referring to the arms or braces mean that these naturally extend outward to provide an outward force or bias, but can be compressed to fit in a defined space (e.g., under the truck bed rails). Each of the braces 14a-d has a first end 15a-d (respectively) and a second end 16a-d (respectively).

The first end 15a-d of each of the braces 14a-d mount to the bed panel 12. The second end 16a-d of each of the braces 14a-d may be positioned under an inside of a bed rail 6 (as illustrated by arrow 5) of the truck bed 1 during installation. The braces 14a-d when so configured apply pressure between the bed rail 6 of the truck bed 1 and the bed panel 12 to secure the bed panel 12 against the floor 2 of the truck bed 1. This holds the bed panel 12 firmly in place on the floor 2 of the truck bed 1, to prevent shifting or movement, and provide a solid foundation for tool boxes, cargo boxes, and other enclosures (e.g., the fenced pet enclosure shown in FIG. 6).

In an example, the bed panel 12 of the example truck bed on-board storage system 10 has one or more "wing". The wings 20a-d enable the bed panel 12 to be readily slid into the floor 2 of the truck bed 1 through the tailgate of the truck and/or lowered into the truck bed 1 from above, without interference from the wheel wells 3 and 4.

In an example, the example truck bed on-board storage system 10 includes rear wings 20a, 20c, and front wings 20b and 20d. The wings are hinged (e.g., via hinges or other pivot connections) to the bed panel 12, and pivot to lay flat in the truck bed 12 in front of and behind the wheel wells 3 and 4.

In an example, each of the braces 14a-d when configured as compression braces, has a first cylinder 22a slidably mounted inside a second cylinder 22b. For example, the braces 14a-d may be hydraulic cylinders or pistons.

In an example, the braces 14a-d each include a locking device to secure the braces 14a-d in place (e.g., at a desired length) to apply pressure from under the truck bed rails onto the bed panel 12. In an example, the locking device or lock mechanism stops the bed panel 12 from lifting up from the floor 2 of the truck bed 1 without modifying the sidewalls or the truck bed 1. For example, there is no need to bolt or otherwise anchor the bed panel 12 to the truck bed floor, thus eliminating the need to drill holes in the truck bed itself. The same braces can be configured for use in truck beds having various size walls.

In an example, the locking device maintains a position of the first cylinder 22a relative to the second cylinder 22b to provide the desired length of the brace(s). In an example, the locking device is a pin 24. The pin 24 is received through a hole or an opening in the first cylinder 22a and a corresponding hole or opening in the second cylinder 22b to fix the position of the first cylinder 22a relative to the second cylinder 22b. When held at the desired length, the brace maintains pressure between the bed rail 6 of the truck bed 1 and the bed panel 12 to hold the bed panel 12 against the floor 2 of the truck bed 1.

Other types of braces may also be provided, as may other locking devices for securing the braces in place. For example, the locking device may be a ratchet-type locking mechanism to maintain the cylinders at the predetermined position. In another example, the braces may include two legs that are hinged and can be extended between the bed rail 6 and the bed panel 12. These and yet other examples will be readily apparent to those having ordinary skill in the art after becoming familiar with the teachings herein.

During installation, the truck bed storage system 10 can be placed into the truck bed 1. No drilling is needed. Tool boxes, cargo boxes, and other enclosures may be secured to the bed panel 12 in the truck bed 1. To remove the truck bed storage system 10, the process for installation can be reversed. Installation and removal of the truck bed storage system 10 may easily be performed by a single person. When removed from the truck bed 1, the truck bed storage system 10 occupies a small space (e.g., relative to the space defined by installed truck bed storage system 10). This feature facilitates storage and transport of the system.

In an example, the truck bed storage system 10 may include one or more compartments. The compartments may be for example, but are not limited to, a cargo box and a tool box. For example, a larger compartment is generally referred to as a cargo box, and a smaller compartment is generally referred to as a tool box. Partitions may also be provided. These compartments may be configured by providing wall panels on the base plate, e.g., in predetermined positions.

Figure 6:
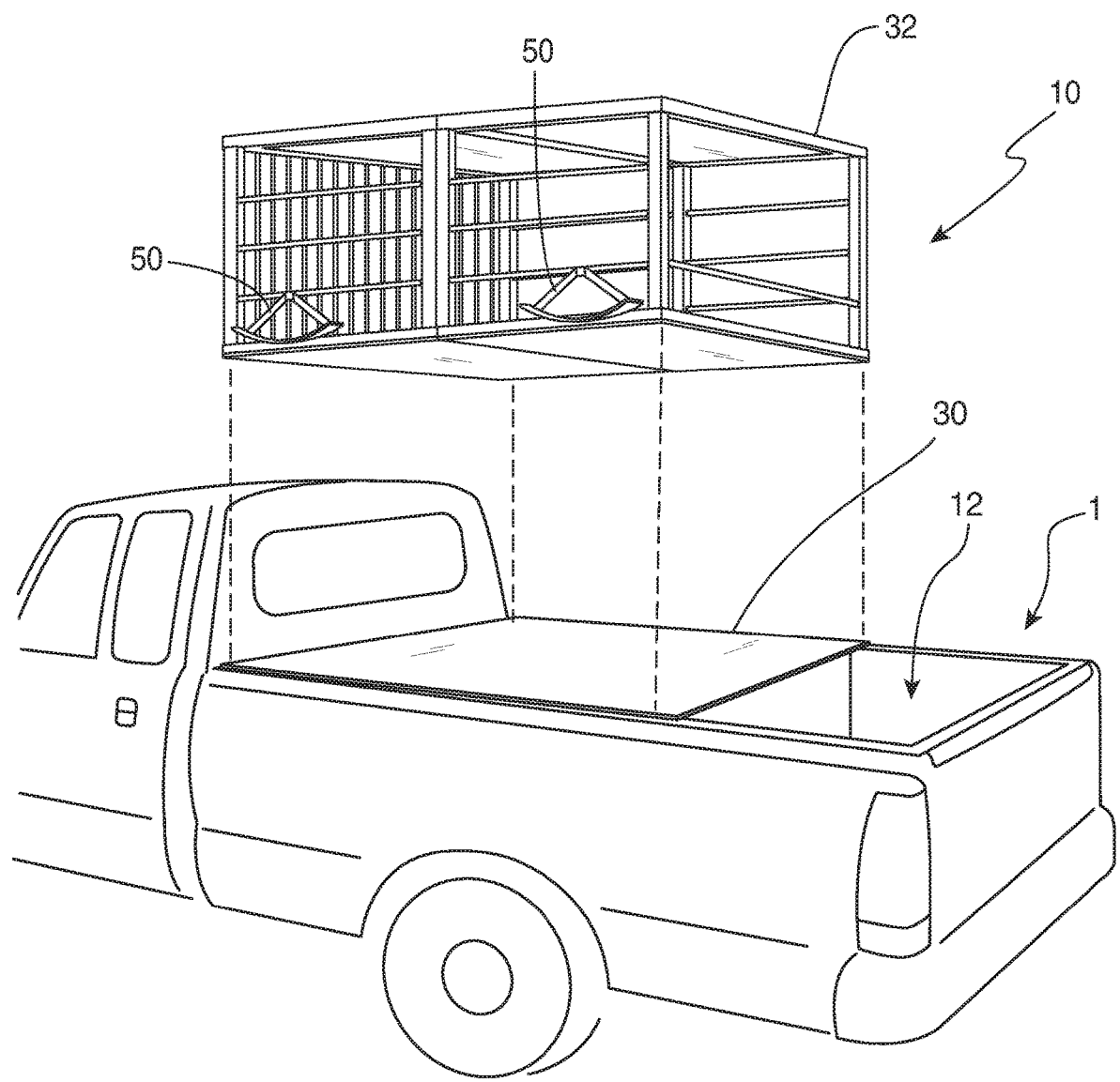
FIG. 6 is a perspective view of the example truck on-board storage system as one or more enclosure may be installed on the truck bed, showing the bicycle rack of FIGS. 4 and 5 installed on the pet enclosure.

The top of the tool box and/or cargo box may provide an upper deck or platform 30 on which enclosures may be mounted (see, e.g., FIG. 6). Various racks (e.g., ski racks, bicycle racks, etc.) may be attached to these enclosures.

Figure 4:
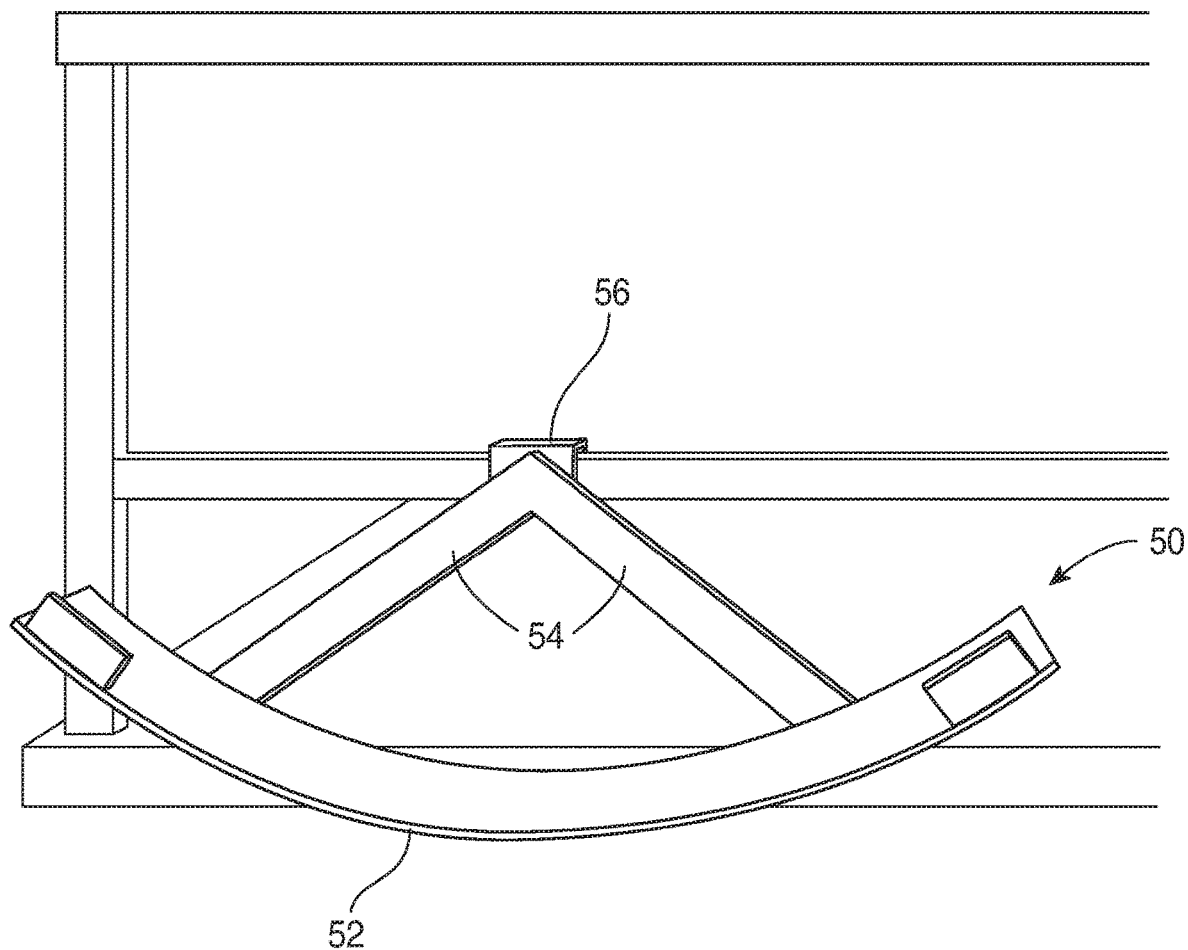
FIG. 4 is a perspective view of an example bicycle rack which may be installed on a pet enclosure of the truck on-board storage system.
Figure 5:
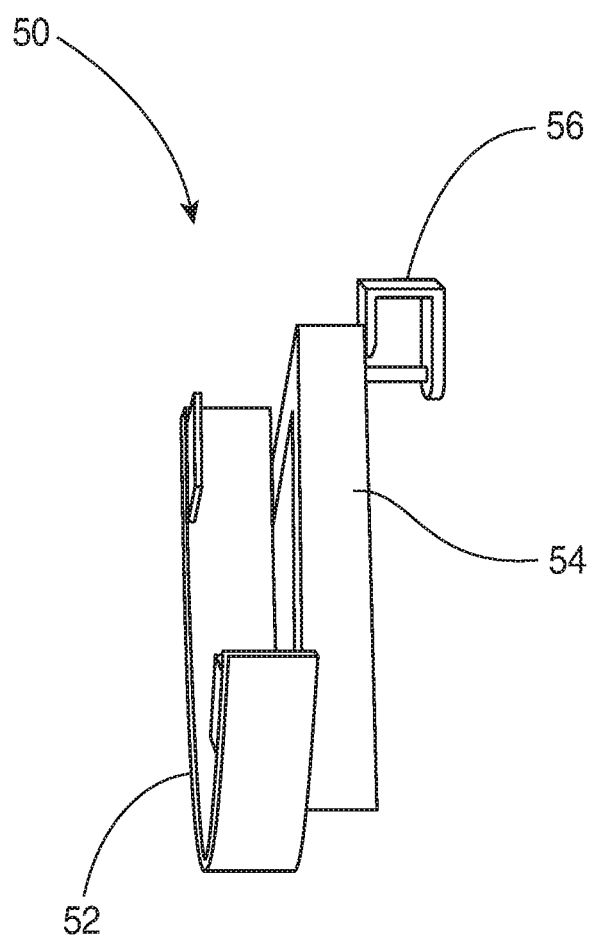
FIG. 5 is a front perspective view of the example bicycle rack of FIG. 4.

FIG. 4 is a perspective view of an example bicycle rack 50 which may be installed on a pet enclosure 32 of the truck on-board storage system 10. FIG. 5 is a front perspective view of the example bicycle rack 50 of FIG. 4. The example bicycle rack 50 is shown as it may have a lower curved portion 52 to support a bicycle tire, and two connector braces 54 with connection 56.

Although any enclosure may be provided (e.g., for carrying suitcases, groceries, etc.), a pet enclosure 32 for carrying pets (e.g., dogs) is shown for purposes of illustration. The pet enclosure 32 may include a fence to contain the pets. The bicycle rack 50 may be installed on the fence of the enclosure, e.g., as shown in FIG. 6.

Still further examples of racks for use with the truck on-board storage system 10 are also contemplated. For example, top and/or side-mount ski racks, boat racks, and other racks may be provided.

The example enclosures, racks, and configurations disclosed herein are provided for purposes of illustration, and are not intended to be limiting in any manner.

FIG. 6 is a perspective view of the example truck on-board storage system 10 as a pet enclosure 32 may be installed on the truck bed 1. The bicycle rack 50 of FIGS. 4 and 5 is also shown installed on the outside fence of the pet enclosure 32. The enclosure (e.g., pet enclosure 32) may be provided on an upper transport deck 30 formed by the lower tool box and/or cargo box.

In an example, the pet enclosure 32 may include one or more hinged side(s). The sides can be hinged to lay flat for storage and shipping. The hinged configuration is easy to assemble and use.

The pet enclosure 32 may be any suitable dimensions. By way of illustration, example dimensions of the enclosure(s) may cover about a quarter of the truck bed 1, one-third of the truck bed 1, one-half of the truck bed 1, about two-thirds of the bed 1, or the entire truck bed 1. It is noted that lid sections of the enclosure(s) may be substantially the same size, or the sections may be different sizes.

The pet enclosure 32 may be provided as an accessory to the storage box, or as a freestanding implementation. The pet enclosure 32 may be provided on top of the box, or may be freestanding (albeit raised) so that the dog or other pet no longer rides down in the hot truck bed without a view of the world.

In an example, the pet enclosure 32 and/or bicycle rack 50 shown herein can be sold separately as a stand alone product (e.g., separate from the truck on-board storage system, as can be seen in FIG. 4). A stand alone pet enclosure 32 may or may not have a floor. For example, the floor may be omitted so that when mounted on the truck bed rails, it will accommodate large or taller dogs. The stand alone pet enclosure 32 may be any suitable size (e.g., covering all or some of the truck bed).

Figure 7:
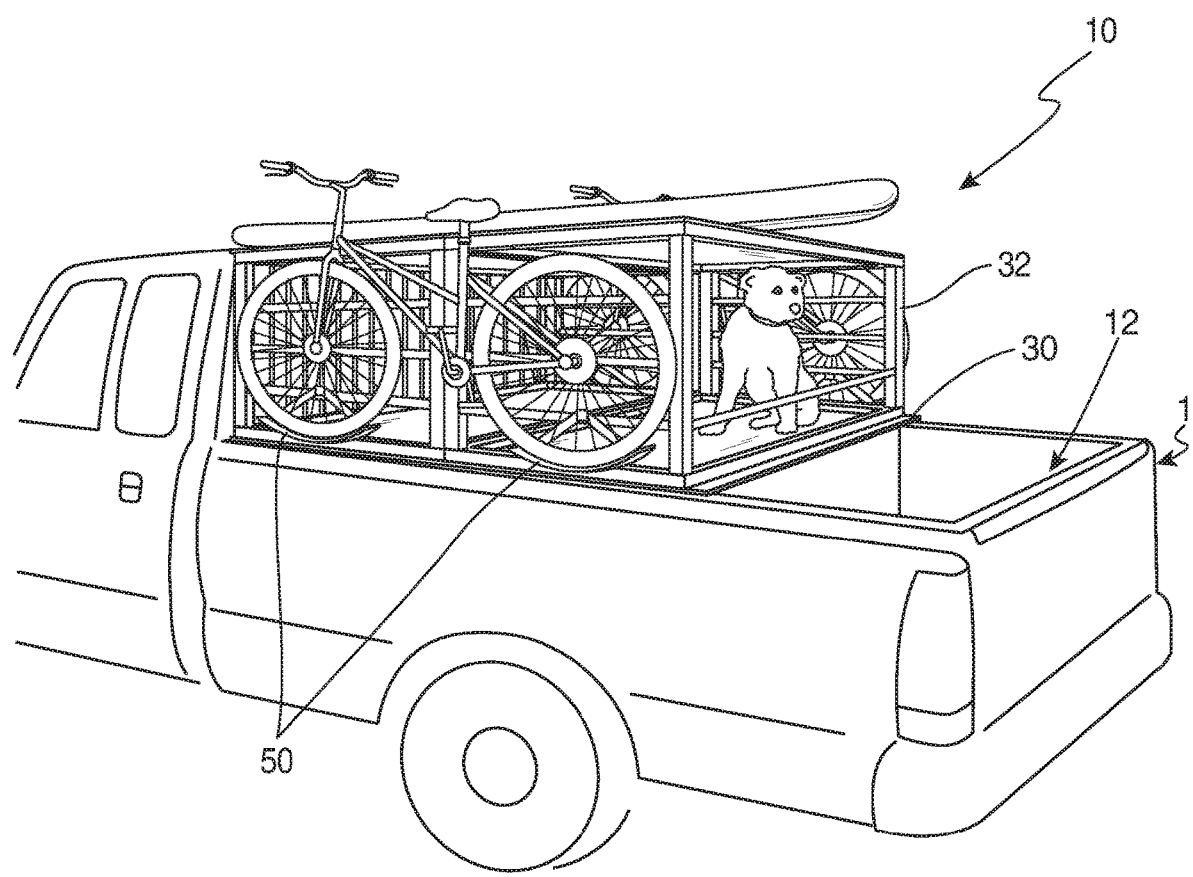
FIG. 7 is a perspective view of the example truck on-board storage system of FIGS. 6 and 7 with the pet enclosure installed on the truck bed and loaded.
Figure 8:
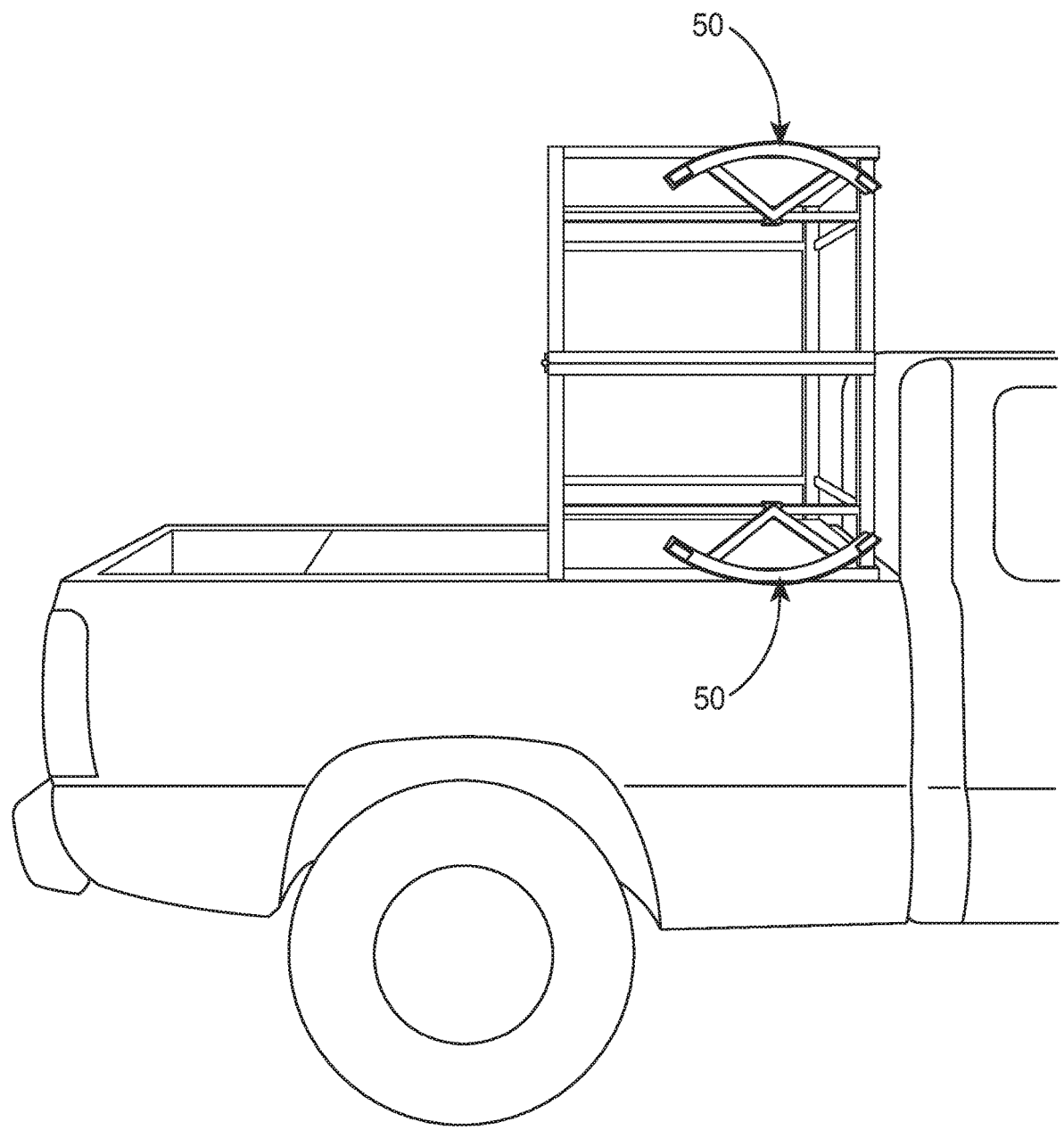
FIGS. 8-10 are perspective views of the example truck on-board storage system of FIGS. 6 and 7 with the pet enclosure folded up for access to the truck bed.
Figure 9:
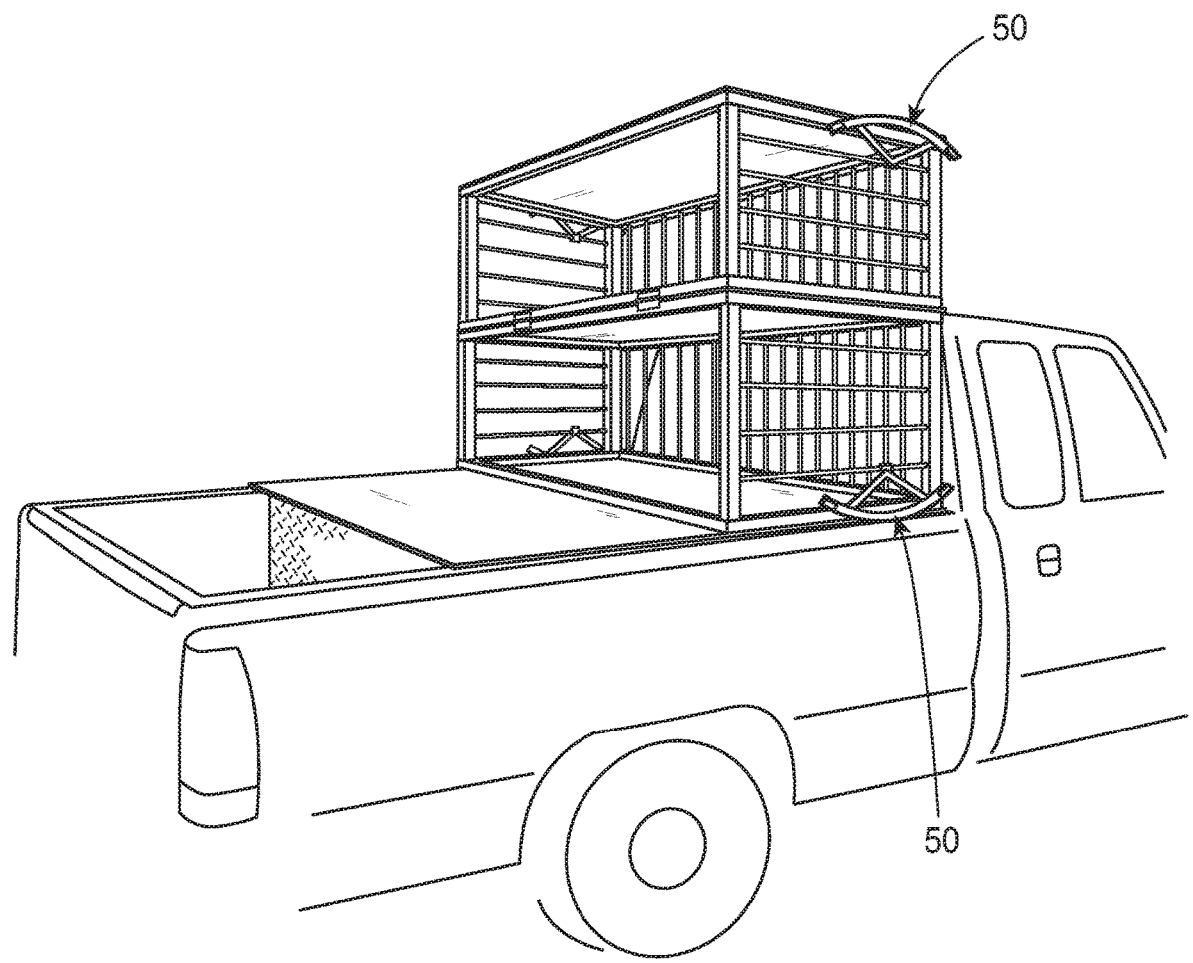
Figure 10:
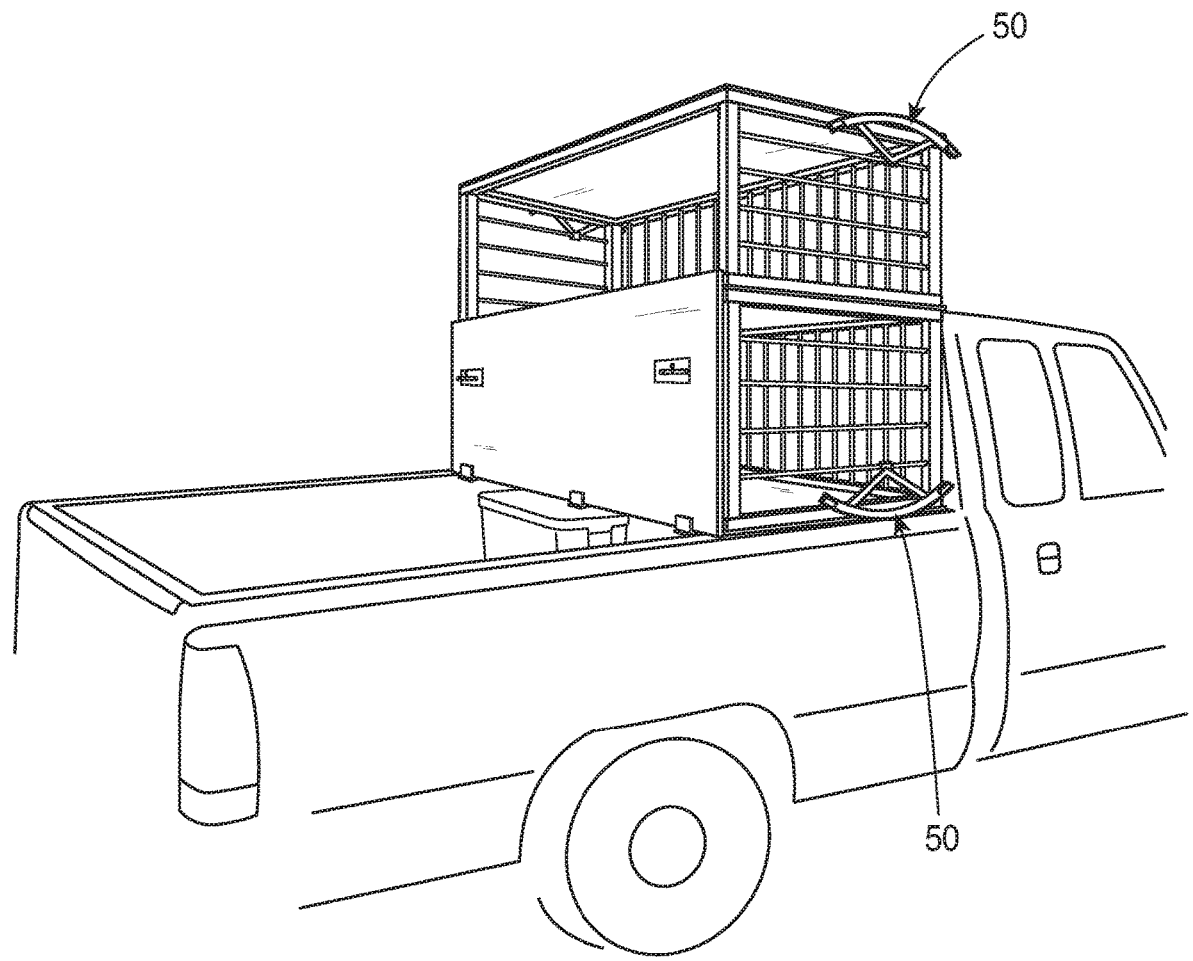

FIG. 7 is a perspective view of the example truck on-board storage system 10 of FIGS. 6 and 7 with the pet enclosure 32 installed on the truck bed and loaded. FIGS. 8-10 are perspective views of the example truck on-board storage system 10 of FIGS. 6 and 7 with the pet enclosure 32 folded up for access to the truck bed 1.

In an example, the pet enclosure 32 may include one or more section. For example, two enclosures may be provided to make a larger enclosure, or a separate pet enclosure 32. In an example, the rear enclosure is hinged to raise and lower, providing access to the storage area formed in the truck bed 1 under the transport deck 30.

It is noted that the truck bed storage system 10 is configurable and reconfigurable, e.g., for different purposes and/or to haul various size loads. In an example, transformation time is less than two minutes.

It is also noted that the examples described above are provided for purposes of illustration, and are not intended to be limiting. Other devices and/or device configurations may be utilized to carry out the operations described herein.

In an example, handles (not shown) may be provided on the bed panel 12 and/or enclosure(s). Handles may facilitate the user during installation and/or tear down. Other accessories may also be provided (e.g., locks and hooks).

It is noted that the truck bed storage system 10 may be manufactured of any suitable material, such as but not limited to, metal (e.g., aluminum diamond plated material is shown as an example in the drawings), plastic, metal or plastic-coated wood, and/or other materials.

The storage system may be provided in any of a variety of sizes according to the size of the storage space desired and the size of the pick-up truck bed into which the system will be assembled. Any of a variety of articles may be held within an assembled truck-bed storage system, for example, tools and camping equipment.

It is noted that the examples shown and described are provided for purposes of illustration and are not intended to be limiting. Still other examples are also contemplated.

The invention claimed is:

1. A truck bed on-board storage system, comprising:
a bed panel configured to fit into a floor of a truck bed of a truck between a right wheel well and a left wheel well of the truck bed; and
a plurality of braces, each brace having a first end and a second end, the first end of each of the braces mounting to the bed panel, and the second end of each of the braces positioned under an inside of a bed rail of the truck bed, wherein the braces apply pressure between the bed rail of the truck bed and the bed panel to secure the bed panel against the floor of the truck bed.

2. The system of claim 1, wherein the plurality of braces include a right front braces mounting to a right front side of the bed panel, and a left front braces mounting to a left front side of the bed panel.

3. The system of claim 1, wherein the plurality of braces include a right rear brace mounting to a right rear side of the bed panel, and a left rear brace mounting to a left rear side of the bed panel.

4. The system of claim 1, wherein the bed panel has a right front wing hinged to a right front side of the bed panel, and a left front wing hinged to a left front side of the bed panel, the right front wing pivoting on the hinge to lay flat in the truck bed in front of the right wheel well, and the left front wing pivoting on the hinge to lay flat in the truck bed in front of the left wheel well.

5. The system of claim 1, wherein the bed panel has a right rear wing hinged to a right rear side of the bed panel, and a left rear wing hinged to a left rear side of the bed panel, the right rear wing pivoting on the hinge to lay flat in the truck bed behind the right wheel well, and the left rear wing pivoting on the hinge to lay flat in the truck bed behind the left wheel well.

6. The system of claim 1, wherein each of the braces has a hydraulic cylinder.

7. The system of claim 1, wherein each of the braces has a first cylinder slidably mounted inside a second cylinder.

8. The system of claim 1, wherein each of the braces is a piston.

9. The system of claim 1, further comprising a first enclosure mounting to the bed panel.

10. The system of claim 9, further comprising a second enclosure mounting to the first enclosure.

11. The system of claim 10, wherein the second enclosure is a pet enclosure.

12. The system of claim 10, further comprising at least one rack mounting to the second enclosure.

13. A truck bed on-board storage system, comprising:
a bed panel configured to fit into a floor of a truck bed of a truck between a right wheel well and a left wheel well of the truck bed;
a right front wing hinged to a right front side of the bed panel, and a left front wing hinged to a left front side of the bed panel, the right front wing pivoting on the hinge to lay flat in the truck bed in front of the right wheel well, and the left front wing pivoting on the hinge to lay flat in the truck bed in front of the left wheel well;
a right rear wing hinged to a right rear side of the bed panel, and a left rear wing hinged to a left rear side of the bed panel, the right rear wing pivoting on the hinge to lay flat in the truck bed behind the right wheel well, and the left rear wing pivoting on the hinge to lay flat in the truck bed behind the left wheel well; and
a plurality of braces, each brace having a first end and a second end, the first end of each of the braces mounting to one of the wings of the bed panel, and the second end of each of the braces positioned under an inside of a bed rail of the truck bed, wherein the braces applies pressure between the bed rail of the truck bed and the bed panel to secure the bed panel against the floor of the truck bed.

14. The system of claim 13, wherein the plurality of braces include a right front brace mounting to a right front side of the bed panel, and a left front brace mounting to a left front side of the bed panel.

15. The system of claim 13 wherein the plurality of braces include a right rear brace mounting to a right rear side of the bed panel, and a left rear brace mounting to a left rear side of the bed panel.

16. The system of claim 13, wherein each of the braces is configured as a compression brace having a first cylinder slidably mounted inside a second cylinder.

17. The system of claim 16, further comprising a pin to secure a position of the first cylinder relative to the second cylinder.

18. The system of claim 17, wherein the pin is received through an opening in the first cylinder and an opening in the second cylinder to fix the position of the first cylinder relative to the second cylinder and thereby maintain pressure between the bed rail of the truck bed and the bed panel to secure the bed panel against the floor of the truck bed.

19. A truck bed on-board storage system, comprising:
a bed panel configured to fit into a floor of a truck bed of a truck between a right wheel well and a left wheel well of the truck bed;
a right front wing hinged to a right front side of the bed panel, and a left front wing hinged to a left front side of the bed panel, the right front wing pivoting on the hinge to lay flat in the truck bed in front of the right wheel well, and the left front wing pivoting on the hinge to lay flat in the truck bed in front of the left wheel well;

a right rear wing hinged to a right rear side of the bed panel, and a left rear wing hinged to a left rear side of the bed panel, the right rear wing pivoting on the hinge to lay flat in the truck bed behind the right wheel well, and the left rear wing pivoting on the hinge to lay flat in the truck bed behind the left wheel well; and a plurality of compression braces including a right front braces mounting to a right front side of the bed panel, and a left front brace mounting to a left front side of the bed panel, a right rear brace mounting to a right rear side of the bed panel, and a left rear brace mounting to a left rear side of the bed panel;

wherein each compression brace has a first end and a second end, the first end of each of the compression braces mounting to one of the wings of the bed panel, and the second end of each of the compression braces positioned under an inside of a bed rail of the truck bed, wherein the compression braces applies pressure between the bed rail of the truck bed and the bed panel to secure the bed panel against the floor of the truck bed.

20. The system of claim 19, wherein each of the compression braces has a first cylinder slidably mounted inside a second cylinder.

* * * * *